(12) United States Patent
Toyota et al.

(10) Patent No.: US 11,081,713 B2
(45) Date of Patent: Aug. 3, 2021

(54) FUEL CELL ACTIVATION METHOD

(71) Applicant: HONDA MOTOR CO., LTD., Tokyo (JP)

(72) Inventors: Shohei Toyota, Wako (JP); Hiromichi Yoshida, Wako (JP); Hayato Kaji, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 301 days.

(21) Appl. No.: 16/365,819

(22) Filed: Mar. 27, 2019

(65) Prior Publication Data

US 2019/0305347 A1 Oct. 3, 2019

(30) Foreign Application Priority Data

Mar. 29, 2018 (JP) .............................. JP2018-065937
Mar. 29, 2018 (JP) .............................. JP2018-065946

(51) Int. Cl.
*H01M 8/04858* (2016.01)
*H01M 8/04223* (2016.01)
*H01M 8/04089* (2016.01)
*H01M 8/04302* (2016.01)
*H01M 8/12* (2016.01)
*H01M 8/1018* (2016.01)
*H01M 8/04298* (2016.01)

(52) U.S. Cl.
CPC ... *H01M 8/04873* (2013.01); *H01M 8/04089* (2013.01); *H01M 8/04223* (2013.01); *H01M 8/04302* (2016.02); *H01M 8/04902* (2013.01); *H01M 8/12* (2013.01); *H01M 8/0488* (2013.01); *H01M 8/04298* (2013.01); *H01M 2008/1095* (2013.01); *Y02E 60/50* (2013.01)

(58) Field of Classification Search
CPC ..... H01M 2008/1095; H01M 8/04089; H01M 8/04223; H01M 8/04298; H01M 8/04302; H01M 8/04873; H01M 8/0488; H01M 8/04902; H01M 8/12; Y02E 60/50
See application file for complete search history.

(56) References Cited

U.S. PATENT DOCUMENTS

2013/0309590 A1* 11/2013 Furusawa ......... H01M 8/04225
429/446

FOREIGN PATENT DOCUMENTS

JP 5526226 6/2014
JP 2017-079194 4/2017

* cited by examiner

*Primary Examiner* — Lingwen R Zeng
(74) *Attorney, Agent, or Firm* — Amin, Turocy & Watson, LLP

(57) ABSTRACT

A voltage is applied between an anode and a cathode in a fuel cell. The voltage is increased to a predetermined upper limit, and then decreased to a predetermined lower limit. The voltage increase and decrease are repeated a predetermined number of times. The voltage is applied to the fuel cell while supplying a hydrogen-containing gas to an anode and supplying an inert gas to a cathode.

8 Claims, 5 Drawing Sheets

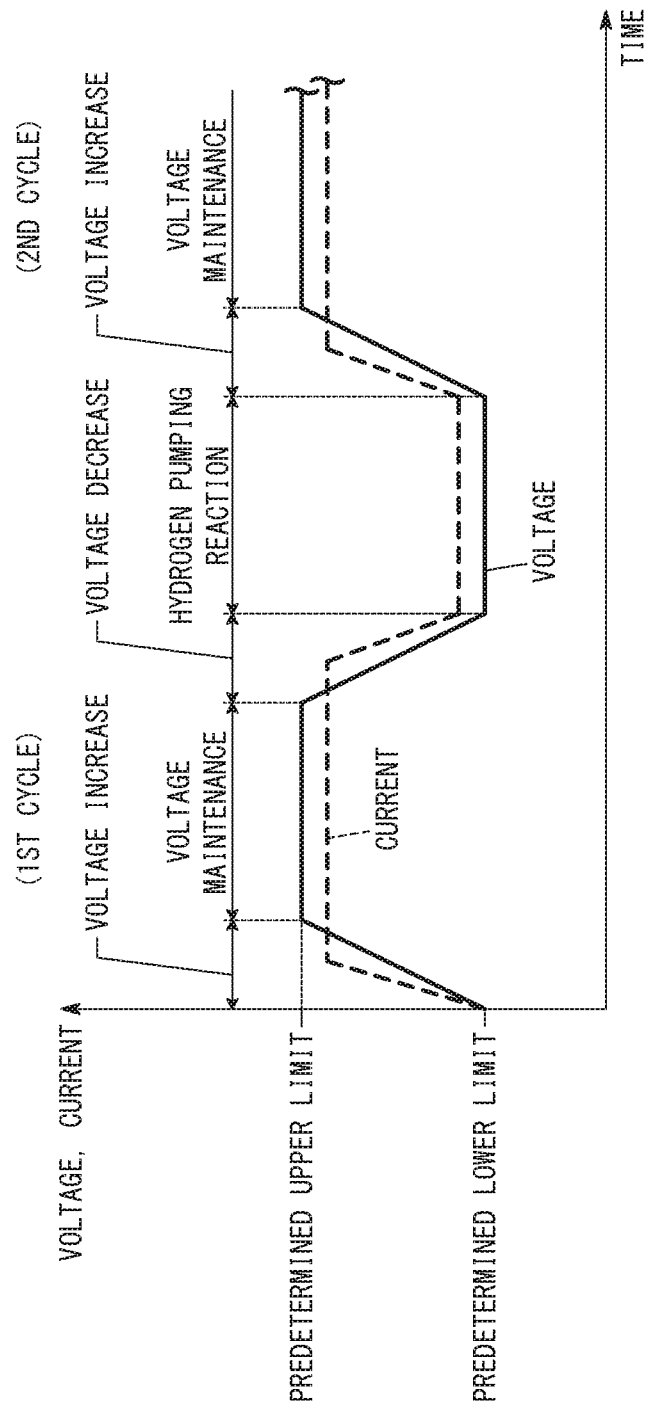

FUEL CELL ACTIVATION METHOD

CROSS-REFERENCE TO RELATED APPLICATION

This application is based upon and claims the benefit of priority from Japanese Patent Applications No. 2018-065937 filed on Mar. 29, 2018 and No. 2018-065946 filed on Mar. 29, 2018, the contents all of which are incorporated herein by reference.

BACKGROUND OF THE INVENTION

Field of the Invention

The present invention relates to a method for activating a fuel cell having an electrolyte membrane containing a solid polymer.

Description of the Related Art

A so-called solid polymer electrolyte fuel cell, which has a membrane electrode assembly containing an anode and a cathode with a solid polymer electrolyte membrane interposed therebetween, has been known as a type of fuel cell.

Each of the anode and the cathode has a catalyst layer containing a metal catalyst of a noble metal such as platinum. Immediately after the production of a fuel cell stack, the catalyst layer does not exhibit a sufficient activity, and therefore the fuel cell stack does not exhibit an excellent power generation property. One reason for this is that the metal catalyst is covered with an impurity such as an oxide or an anionic species.

Therefore, the fuel cell stack is subjected to an activation treatment for removing the impurity to expose and maintain an active metal surface. For example, Japanese Laid-Open Patent Publication No. 2017-079194 discloses an activation method. In this activation method, an oxygen-containing gas and an inert gas are alternately supplied to the cathode. The supply of the oxygen-containing gas and the supply of the inert gas are repeated two or more times while supplying a hydrogen gas to the anode.

Furthermore, Japanese Patent No. 5526226 of the applicant discloses an activation method containing repeating first and second steps. In the first step, a varying voltage is applied between the anode and the cathode. In the second step, protons generated in the anode are transferred through the electrolyte membrane to the cathode, and the transferred protons are bonded to electrons to generate hydrogen in the cathode (in a so-called hydrogen pumping reaction).

SUMMARY OF THE INVENTION

A large amount of the noble metal such as platinum for the metal catalyst results in a high material cost for the fuel cell. Accordingly, there have been various studies on reducing the amount of the metal catalyst. However, in a case where the amount of the metal catalyst is reduced, sulfonate ions (anions) are introduced from the electrolyte membrane into the catalyst layer, and act to lower the activity of the metal catalyst. Therefore, a sufficient power generation property is hardly obtained until a surface of the metal catalyst is washed with water generated in the power generation process.

A principal object of the present invention is to provide a simple method capable of easily activating a fuel cell.

According to an aspect of the present invention, there is provided a first method for activating a fuel cell. The fuel cell has a pair of separators and a membrane electrode assembly sandwiched therebetween, the membrane electrode assembly contains an anode and a cathode with an electrolyte membrane interposed therebetween, and the electrolyte membrane contains a solid polymer. In the first method, a voltage is applied to the fuel cell while supplying a hydrogen-containing gas to the anode and supplying an inert gas to the cathode. The first method comprises a voltage increase step of increasing the voltage to a predetermined upper limit, a voltage decrease step of decreasing the voltage to a predetermined lower limit, and a hydrogen pumping reaction step of carrying out a hydrogen pumping reaction while maintaining the voltage at the predetermined lower limit, and a cycle containing the voltage increase step, the voltage decrease step, and the hydrogen pumping reaction step is repeated two or more times.

According to another aspect of the present invention, there is provided a second method for activating a fuel cell. The fuel cell has a pair of separators and a membrane electrode assembly sandwiched therebetween, the membrane electrode assembly contains an anode and a cathode with an electrolyte membrane interposed therebetween, and the electrolyte membrane contains a solid polymer. In the second method, a voltage is applied to the fuel cell while supplying a hydrogen-containing gas to the anode and supplying an inert gas to the cathode. The second method comprises a voltage increase step of increasing the voltage to a predetermined upper limit, a voltage maintenance step of maintaining the voltage at the predetermined upper limit, and a voltage decrease step of decreasing the voltage to a predetermined lower limit, and a cycle containing the voltage increase step, the voltage maintenance step, and the voltage decrease step is repeated two or more times.

In both of the first and second methods, particularly an oxide covering a surface of a metal catalyst contained in a catalyst layer in the cathode is removed. Furthermore, in an oxidation process, a catalyst carrier material is subjected to a high electric potential, and a surface area of the catalyst carrier material is increased. Thus, an area of a reaction field containing oxygen atoms, protons, and electrons is increased. As a result, an active surface area of the metal catalyst in the reaction field is increased.

Particularly the catalyst layer in the cathode contains sulfonate ions derived from the electrolyte membrane. Therefore, the first method contains the hydrogen pumping reaction step. In this step, a moist gas is supplied to the anode, and water accompanying with the protons is transferred from the anode to the cathode through the electrolyte membrane. The water forms dew condensation on the catalyst layer of the cathode, and is removed together with the sulfonate ions from the cathode through a gas diffusion layer. The sulfonate ions in the catalyst layer of the cathode are removed in this manner.

Furthermore, because the water is transferred as described above, the electrolyte membrane is in a sufficiently wet state. Consequently, the proton conduction is improved, and the fuel cell exhibits an excellent power generation property.

In addition, only the hydrogen participates in the hydrogen pumping reaction. A low overvoltage property of the hydrogen allows a high current to continuously flow in the fuel cell. Consequently, the time required for the activation treatment can be shortened.

For the above reason, it is preferred that also the second method contains the hydrogen pumping reaction step. In this case, the hydrogen pumping reaction may be carried out while maintaining the voltage at the predetermined lower limit after the voltage decrease step before the voltage increase step in the next cycle.

In the first and second methods, it is not preferred that the voltage is greatly changed at once in the voltage increase step and the voltage decrease step. It is preferred that the voltage is gradually changed with time. Thus, it is preferred that a temporal change of the voltage is caused in each of the voltage increase step and the voltage decrease step. For example, the voltage may be linearly changed proportionally to the elapsed time, may be changed stepwise, and may be changed in a curved line manner. In this case, the voltage can be reliably controlled within the range below the upper limit.

When the predetermined upper limit is an excessively large value, the number of metallic bonds tends to be reduced whereas the number of metal-oxygen bonds tends to be increased in the catalyst layer. In view of solving this problem, for example, it is preferred that the predetermined upper limit is about 1 V. Incidentally, for example, it is preferred that the predetermined lower limit is about 0 V.

In the second method, the voltage maintenance step may be carried out for an optimum period depending on the effects of the steps. For example, the voltage maintenance step may be carried out preferably for a period of 30 to 300 seconds, more preferably for a period of 40 to 120 seconds. In this case, the increase of the active surface area of the metal catalyst may be improved in the catalyst layer. The oxide and the sulfonate ions are removed mainly in the voltage decrease step.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 5 is a time chart for illustrating changes of a voltage and a current.

DESCRIPTION OF THE PREFERRED EMBODIMENTS

Several preferred embodiments of the fuel cell activation methods of the present invention will be described in detail below with reference to accompanying drawings. The first embodiment is an embodiment of the first method, and the second embodiment is an embodiment of the second method.

Figure 1:
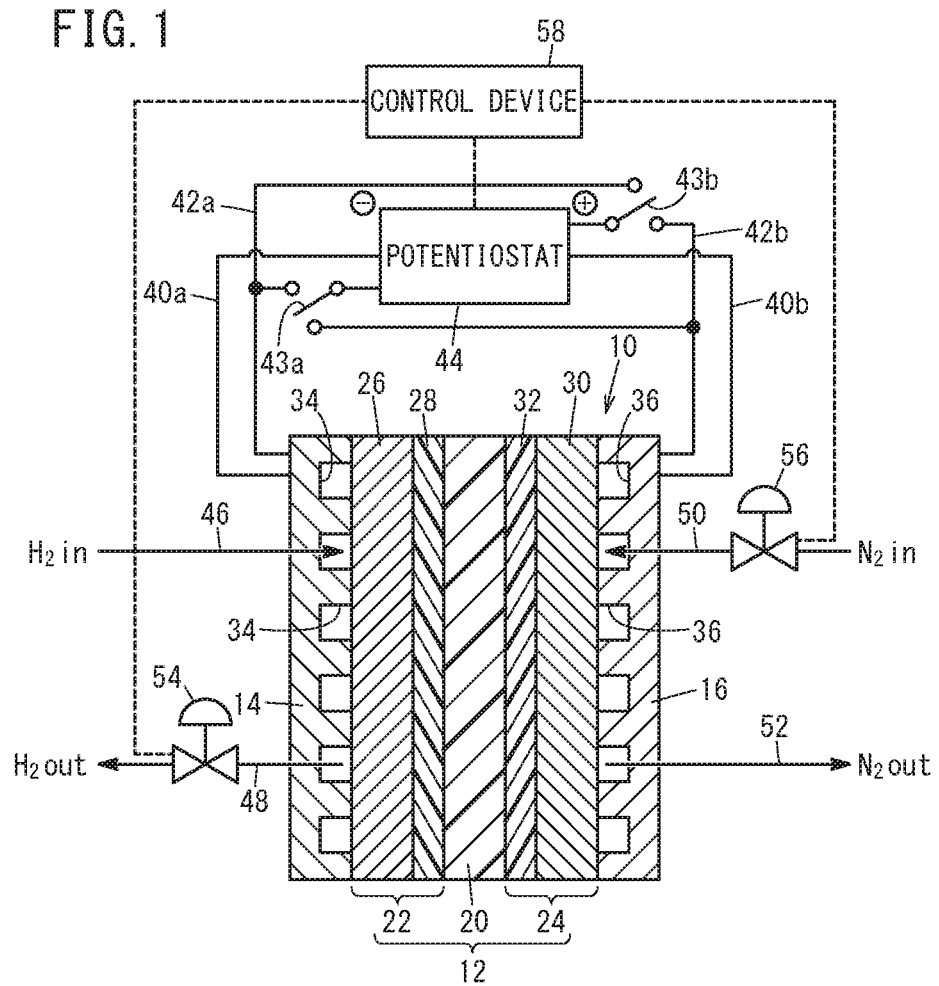
FIG. 1 is a schematic cross-sectional view of a structure for fuel cell activation methods according to first and second embodiments of the present invention.

FIG. 1 is a schematic cross-sectional view of a unit cell of a fuel cell 10. Although the unit cell of the fuel cell 10 is shown in FIG. 1 to facilitate understanding, a plurality of the unit cells are stacked to produce a fuel cell stack in practical use. Regardless of whether the fuel cell 10 is used in the form of the unit cell or the fuel cell stack, the fuel cell 10 can be activated by the activation methods of the present invention.

The unit cell will be described below. The unit cell has a first separator 14 and a second separator 16 (a pair of separators), and further has a membrane electrode assembly 12 sandwiched between the separators.

The membrane electrode assembly 12 has an anode 22 and a cathode 24 with an electrolyte membrane 20 interposed therebetween. The electrolyte membrane 20 contains a proton-conductive solid polymer. For example, the solid polymer may be a perfluorosulfonic acid-based fluororesin or a hydrocarbon-based resin.

The anode 22 is formed on one surface of the electrolyte membrane 20. The anode 22 contains an anode gas diffusion layer 26 and an anode catalyst layer 28. A fuel gas such as a hydrogen gas is supplied to the anode gas diffusion layer 26. The anode catalyst layer 28 is arranged facing the electrolyte membrane 20.

The cathode 24 is formed on the other surface of the electrolyte membrane 20. The cathode 24 contains a cathode gas diffusion layer 30 and a cathode catalyst layer 32. An oxygen-containing gas such as an air or an oxygen gas is supplied to the cathode gas diffusion layer 30 during the operation of the fuel cell 10. The cathode catalyst layer 32 is arranged facing the electrolyte membrane 20.

For example, each of the anode gas diffusion layer 26 and the cathode gas diffusion layer 30 contains a carbon paper, a carbon cloth, a metal mesh, a sintered metal body, or the like. These materials are conductive porous bodies. Therefore, the fuel gas, the oxygen-containing gas, or the like can be readily diffused therein.

For example, the anode catalyst layer 28 and the cathode catalyst layer 32 are formed by uniformly applying porous carbon particles having a metal catalyst such as platinum or an alloy thereof together with an ion-conductive polymer binder to surfaces of the anode gas diffusion layer 26 and the cathode gas diffusion layer 30 (or the both surfaces of the electrolyte membrane 20). The anode catalyst layer 28 and the cathode catalyst layer 32 are arranged facing each other with the electrolyte membrane 20 interposed therebetween. Particles of the metal catalyst may be applied together with the ion-conductive polymer binder to the anode gas diffusion layer 26 and the cathode gas diffusion layer 30 without using the porous carbon particles.

For example, each of the first separator 14 and the second separator 16, between which the membrane electrode assembly 12 is sandwiched, is a metal plate such as a steel plate, a stainless steel plate, an aluminum plate, or a titanium plate. A surface of the metal plate may be subjected to an anti-corrosion treatment (such as a plating treatment). A carbon plate may be used instead of the metal plate.

A fuel gas flow field 34 for supplying the fuel gas to the anode 22 is formed on the surface of the first separator 14 facing the anode gas diffusion layer 26. Similarly, an oxygen-containing gas flow field 36 for supplying the oxygen-containing gas to the cathode 24 during the use of the fuel cell 10 is formed on the surface of the second separator 16 facing the cathode gas diffusion layer 30.

A potentiostat 44 is electrically connected to the fuel cell 10 having such structure via current application wires 40a, 40b and voltage application wires 42a, 42b. Switches 43a, 43b are formed on the voltage application wires 42a, 42b. The polarity of the voltage applied to the fuel cell 10 can be reversed by changing a state of the switches 43a, 43b. Although the application wires 40a, 40b, 42a, 42b are connected to collector plates (not shown) arranged adjacent to the first separator 14 and the second separator 16, the application wires 40*a*, 40*b*, 42*a*, 42*b* are connected electrically equivalently to the first separator 14 and the second separator 16 in FIG. 1.

By using the potentiostat 44, the voltage applied to the fuel cell 10 can be changed from one arbitrary value to another arbitrary value at a predetermined change rate, and can be maintained at a value if necessary. Thus, the voltage applied to the fuel cell 10 can be controlled by the potentiostat 44. A direct-current power source capable of applying a predetermined direct voltage may be used instead of the potentiostat 44.

The fuel cell 10 further has an anode gas supply line 46 for supplying a fuel gas to the anode 22 and an anode gas discharge line 48 for discharging a hydrogen gas from the anode 22. Similarly, the fuel cell 10 further has a cathode gas supply line 50 for supplying an inert gas to the cathode 24 during the activation treatment and a cathode gas discharge line 52 for discharging a nitrogen gas from the cathode 24. The anode gas supply line 46, the anode gas discharge line 48, the cathode gas supply line 50, and the cathode gas discharge line 52 are simplistically shown in FIG. 1.

A cutoff valve 54 is installed on the anode gas discharge line 48, and a cutoff valve 56 is installed on the cathode gas supply line 50. The potentiostat 44 and the cutoff valves 54, 56 are controlled by a control device 58.

An example of the fuel cell 10 activation method of the first embodiment will be described below. In the following example, a moist hydrogen gas is used as the fuel gas, and a moist nitrogen gas is used as the inert gas.

In the first embodiment, the fuel cell 10 (the unit cell or the fuel cell stack) is subjected to the activation treatment immediately after the production of the fuel cell 10. First, the anode gas supply line 46, the anode gas discharge line 48, the cathode gas supply line 50, and the cathode gas discharge line 52 are connected to the fuel cell 10 as produced, and the potentiostat 44 is electrically connected to the fuel cell 10 by the current application wires 40*a*, 40*b* and the voltage application wires 42*a*, 42*b*. Furthermore, the potentiostat 44 and the cutoff valves 54, 56 are electrically connected to a control circuit.

Then, when the cutoff valves 54, 56 are in the open states, the moist hydrogen gas is supplied to the anode 22 through the anode gas supply line 46, and the moist nitrogen gas is supplied to the cathode 24 through the cathode gas supply line 50. The moist hydrogen gas is transferred through the fuel gas flow field 34 in the first separator 14, diffused in the anode gas diffusion layer 26, and introduced to the anode catalyst layer 28. The excess of the moist hydrogen gas is discharged through the anode gas discharge line 48. Similarly, the moist nitrogen gas is transferred through the oxygen-containing gas flow field 36 in the second separator 16, diffused in the cathode gas diffusion layer 30, and introduced to the cathode catalyst layer 32. The excess of the moist nitrogen gas is discharged through the cathode gas discharge line 52. The excess portions of the moist hydrogen gas and the moist nitrogen gas may be circulated and reused.

Figure 2:
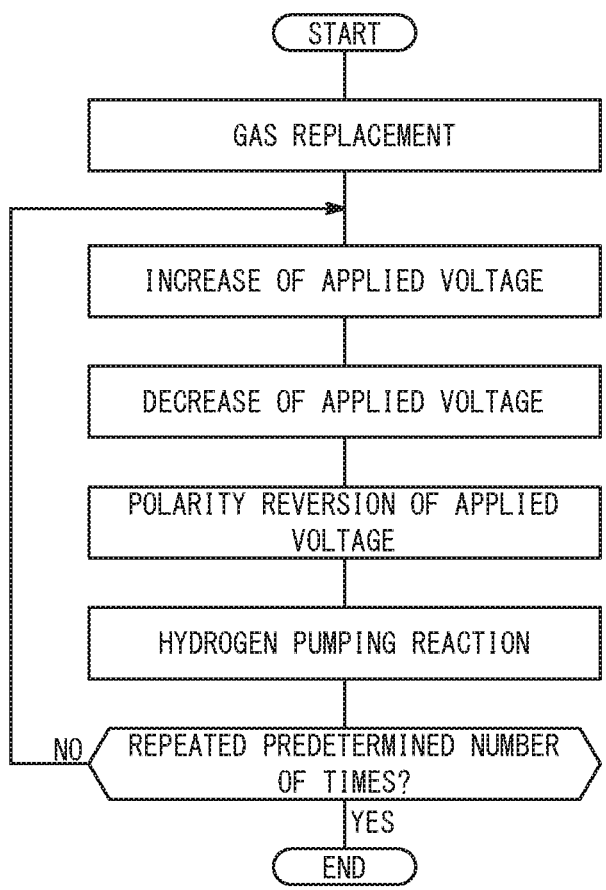
FIG. 2 is a general flowchart of the fuel cell activation method of the first embodiment.
Figure 3:
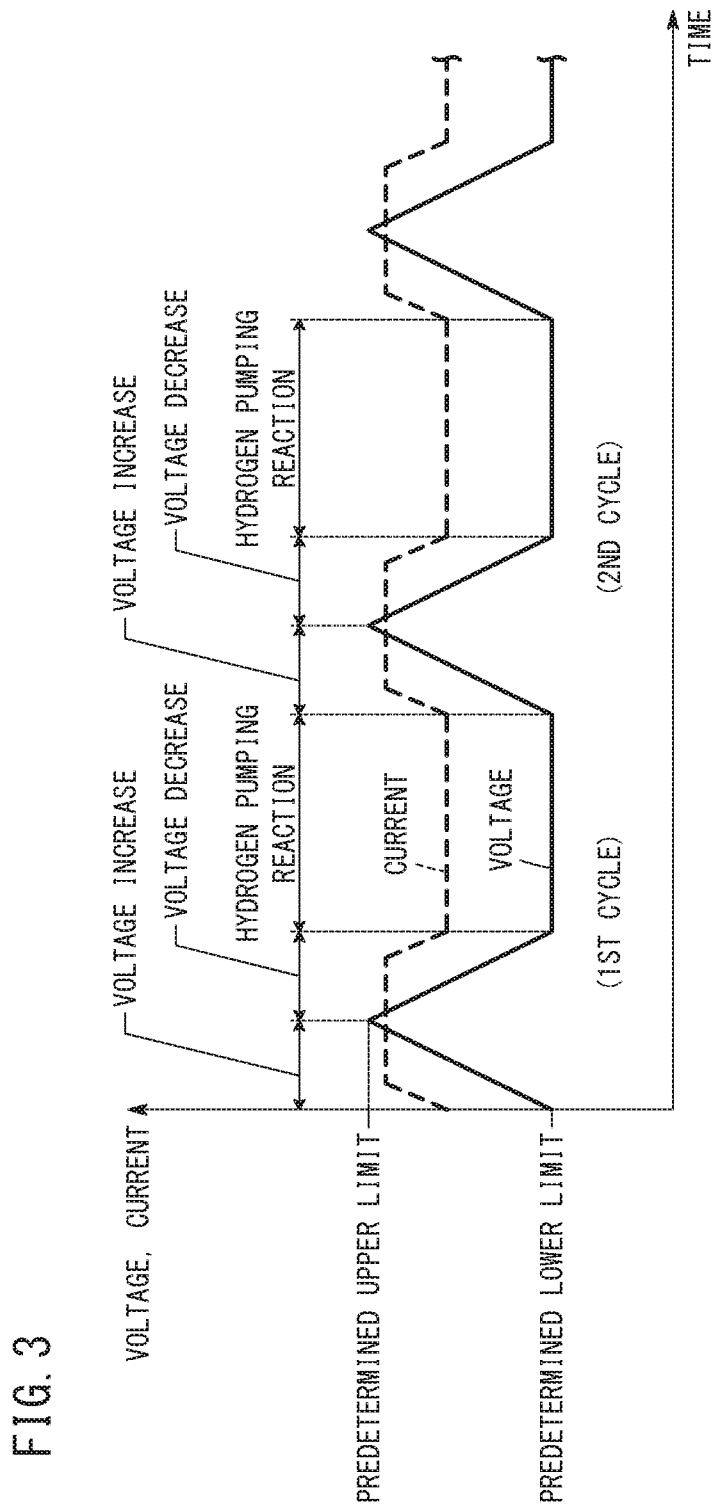
FIG. 3 is a time chart for illustrating changes of a voltage and a current.

When the moist hydrogen gas and the moist nitrogen gas are supplied and discharged in the above manner, an air in the fuel gas flow field 34 and the oxygen-containing gas flow field 36 is replaced by the moist hydrogen gas and the moist nitrogen gas. Then, as shown in FIGS. 2 and 3, a voltage increase step, a voltage decrease step, and a hydrogen pumping reaction step are carried out. Also changes of a current are shown in FIG. 3.

A voltage is applied to the fuel cell 10 using the potentiostat 44 by using a technology similar to a potential sweeping technology for cyclic voltammetry. In this process, the anode 22 is used as a reference electrode, the anode 22 is used as a negative electrode, the cathode 24 is used as a positive electrode, and the electric potential difference is considered as the applied voltage.

In the voltage increase step, a varying voltage is applied. Thus, the voltage is increased to a predetermined upper limit. For example, the predetermined upper limit may be 1 V. It is preferred that the voltage is gradually increased. For example, as shown in FIG. 3, the voltage may be linearly increased proportionally to the elapsed time. Alternatively, the voltage may be increased stepwise. Alternatively, the voltage may be increased in a curved line manner. In this case, the voltage can be reliably controlled within the range below the upper limit.

Immediately after the voltage is increased to the predetermined upper limit, the voltage decrease to a predetermined lower limit is started without maintaining the voltage at the predetermined upper limit. Thus, the voltage decrease step is carried out. Oxides and sulfonate ions seem to be removed mainly in the voltage decrease step.

For example, the predetermined lower limit may be 0 V. It is preferred that the voltage is gradually decreased in the same manner as above to prevent rapid change of the current. For example, as shown in FIG. 3, the voltage may be linearly decreased proportionally to the elapsed time. Alternatively, the voltage may be decreased stepwise or in a curved line manner in the same manner as above.

After the voltage is decreased to the predetermined lower limit, the hydrogen pumping reaction step is carried out while maintaining the voltage at the predetermined lower limit. Specifically, the moist nitrogen gas is transferred through the cathode gas supply line 50. In this step, the cutoff valve 56 on the cathode gas supply line 50 may be in the closed state to stop the supply of the moist nitrogen gas to the oxygen-containing gas flow field 36. The cutoff valve 54 on the anode gas discharge line 48 may be in the closed state while transferring the moist hydrogen gas through the anode gas supply line 46. Alternatively, the cutoff valve 54 may be in the open state to continuously supplying the moist hydrogen gas to the fuel gas flow field 34.

Then, the polarity of the applied voltage is reversed. Thus, a voltage is applied using the anode 22 as a positive electrode and using the cathode 24 as a negative electrode. The voltage is continuously applied to the fuel cell 10, and a predetermined current flows from the cathode 24 to the anode 22. Therefore, hydrogen atoms are ionized to generate protons and electrons in an oxidation reaction in the anode catalyst layer 28. The protons are transferred through the electrolyte membrane 20 to the cathode catalyst layer 32, and the electrons are transferred through the current application wires 40*a*, 40*b* from the anode 22 to the cathode 24 (thus, the current flows from the cathode 24 to the anode 22).

The transferred protons and electrons are recombined to generate hydrogen in a reduction reaction in the cathode catalyst layer 32. The hydrogen generated in the reduction reaction is discharged through the cathode gas discharge line 52. The water in the moist hydrogen gas permeates into the electrolyte membrane 20 during the reaction.

After the hydrogen pumping reaction is carried out for a predetermined period, the electrodes of the potentiostat 44 are reversed, and thus the polarity of the voltage applied to the fuel cell 10 is reversed. In this process, the cutoff valves 54, 56 may be in the open states, and the supply of the moist nitrogen gas to the cathode 24 may be restarted. Then, the applied voltage is increased in the voltage increase step in the second cycle. Thereafter, the voltage decrease step and the hydrogen pumping reaction step are carried out again.

The cycle of the voltage increase step, the voltage decrease step, and the hydrogen pumping reaction step is repeated a predetermined number of times (e.g. several tens to several hundreds of times) to complete the activation treatment.

Particularly the oxide formed on the surface of the metal catalyst in the cathode catalyst layer 32 can be removed by performing the voltage increase step and the voltage decrease step. Furthermore, in the oxidation process, the catalyst carrier material is subjected to high electric potential, and a surface area of the catalyst carrier material is increased. Thus, an area of a reaction field containing oxygen atoms, protons, and electrons is increased. As a result, the active surface area of the metal catalyst in the reaction field is increased.

Particularly the cathode catalyst layer 32 contains the sulfonate ions derived from the electrolyte membrane 20. When the moist hydrogen gas is supplied to the anode 22 in the hydrogen pumping reaction step, water containing the protons proton-entraining water) is transferred through the electrolyte membrane 20 from the anode 22 to the cathode 24.

The water forms dew condensation on the cathode catalyst layer 32 to generate dew condensation water. The sulfonate ions in the cathode catalyst layer 32 are discharged together with the dew condensation water through the cathode gas diffusion layer 30 to the outside of the cathode 24. By removing the sulfonate ions in the cathode catalyst layer 32 in this manner, the activity of the fuel cell 10 is further improved.

In addition, only the hydrogen participates in the hydrogen pumping reaction. A low overvoltage property of the hydrogen allows a high current to continuously flow in the fuel cell 10. As a result, the time required for the activation treatment can be shortened. Furthermore, because the water permeates into the electrolyte membrane 20, the electrolyte membrane 20 can be maintained in a sufficiently wet condition.

For the above reasons, the power generation property of the fuel cell 10 can be improved. In other words, the fuel cell 10 can be effectively activated.

An example of the fuel cell 10 activation method of the second embodiment will be described below. In the following example of the second embodiment, as well as the above example of the first embodiment, the moist hydrogen gas is used as the fuel gas, and the moist nitrogen gas is used as the inert gas.

Also in the second embodiment, the fuel cell 10 (the unit cell or the fuel cell stack) is subjected to the activation treatment immediately after the production of the fuel cell 10. The attachment of the anode gas supply line 46, the anode gas discharge line 48, the cathode gas supply line 50, the cathode gas discharge line 52, and the like to the fuel cell 10 as produced and the supply of the moist hydrogen gas and the moist nitrogen gas through the anode gas supply line 46 and the cathode gas supply line 50 to the anode 22 and the cathode 24 in the second embodiment are carried out in the same manner as in the first embodiment, and therefore detailed explanations thereof are omitted.

Figure 4:
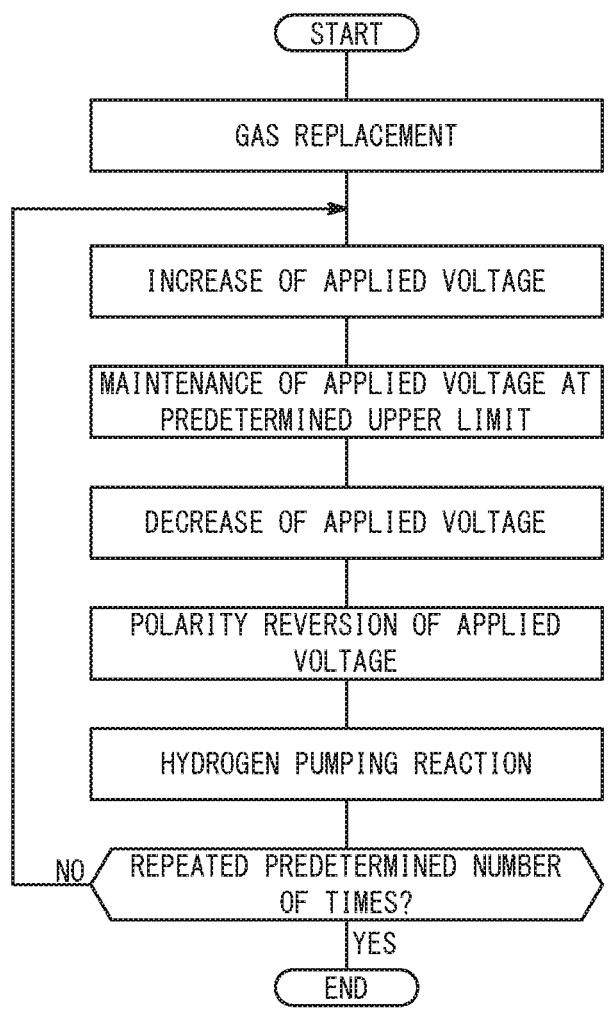
FIG. 4 is a general flowchart of the fuel cell activation method of the second embodiment.

When the moist hydrogen gas and the moist nitrogen gas are supplied and discharged in the above manner, an air in the fuel gas flow field 34 and the oxygen-containing gas flow field 36 is replaced by the moist hydrogen gas and the moist nitrogen gas. Then, as shown in FIGS. 4 and 5, a voltage increase step, a voltage maintenance step, and a voltage decrease step are carried out. Also changes of current are shown in FIG. 5.

Thus, as in the first embodiment, a voltage is applied to the fuel cell 10 using the potentiostat 44 also in the second embodiment. In this process, the anode 22 is used as a reference electrode, the anode 22 is used as a negative electrode, the cathode 24 is used as a positive electrode, and the electric potential difference between the electrodes 22, 24 is considered as the applied voltage.

In the voltage increase step, a varying voltage is applied. Thus, the voltage is increased to a predetermined upper limit. For example, the predetermined upper limit may be 1 V. It is preferred that the voltage is gradually increased. For example, as shown in FIG. 5, the voltage may be linearly increased proportionally to the elapsed time. Alternatively, the voltage may be increased stepwise or in a curved line manner. In this case, the voltage can be reliably controlled within the range below the upper limit.

In the second embodiment, the voltage is increased to the predetermined upper limit, and then is maintained at the predetermined upper limit. Thus, the voltage maintenance step is carried out. In the voltage maintenance step, the metal catalyst in the cathode catalyst layer 32 is oxidized. For example, the voltage is maintained at the upper limit preferably for a period of 30 to 300 seconds, more preferably for a period of 40 to 120 seconds.

After the voltage maintenance step is carried out for a predetermined period, the voltage decrease to a predetermined lower limit is started. Thus, the voltage decrease step is carried out. The voltage decrease step in the second embodiment may be carried out in the same manner as that in the first embodiment. In the voltage decrease step, it is preferred that the voltage is gradually decreased (see FIG. 5).

After the voltage is decreased to the predetermined lower limit (e.g. 0 V), it is preferred that a hydrogen pumping reaction step is carried out. Specifically, the hydrogen pumping reaction step in the second embodiment may be carried out in the same manner as in the first embodiment. The activation method of the second embodiment does not have to contain the hydrogen pumping reaction step.

Then, the polarity of the applied voltage is reversed in the same manner as above. Thus, a voltage is applied using the anode 22 as a positive electrode and using the cathode 24 as a negative electrode. Then, hydrogen atoms are ionized to generate protons and electrons in an oxidation reaction in the anode catalyst layer 28. The protons and electrons are transferred to the cathode 24, and are recombined in a reduction reaction in the cathode catalyst layer 32. Meanwhile, the water in the moist hydrogen gas permeates into the electrolyte membrane 20.

After the hydrogen pumping reaction is carried out for a predetermined period, the electrodes of the potentiostat 44 are reversed, and thus the polarity of the voltage applied to the fuel cell 10 is reversed. Then, the applied voltage is increased in the voltage increase step in the second cycle. Thereafter, the voltage maintenance step, the voltage decrease step, and the hydrogen pumping reaction step are carried out again. The cycle of the voltage increase step, the voltage maintenance step, the voltage decrease step, and the hydrogen pumping reaction step is repeated a predetermined number of times (e.g. several tens to several hundreds of times) to complete the activation treatment.

The fuel cell 10 can be effectively activated by the activation method of the second embodiment containing the above steps for the same reasons as in the first embodiment.

Although the fuel cell 10 is subjected to the activation treatment immediately after the production of the fuel cell 10 in the examples of the above first and second embodiments, the present invention is not limited to the examples. For example, in a case where the fuel cell 10 is used to generate an electric power, the power generation is stopped, and then the power generation is restarted, the fuel cell 10 may be activated by the activation method of the present invention before the restart. For example, in a case where the fuel cell 10 is used for a long period and the activity of the catalyst is lowered, the fuel cell 10 may be activated by the activation method of the present invention to increase the activity.

Although certain preferred embodiments of the present invention have been shown and described in detail, it should be understood that various changes and modifications may be made therein without departing from the scope of the appended claims.

What is claimed is:

1. A method for activating a fuel cell having a membrane electrode assembly sandwiched between a pair of separators, wherein the membrane electrode assembly contains an anode and a cathode with a solid polymer electrolyte membrane interposed between the anode and the cathode, the method comprising:
a step of applying a voltage to the fuel cell while supplying a hydrogen-containing gas to the anode and supplying an inert gas to the cathode,
a voltage increase step of increasing the voltage to a predetermined upper limit,
a voltage decrease step of decreasing the voltage to a predetermined lower limit,
a hydrogen pumping reaction step of carrying out a hydrogen pumping reaction while maintaining the voltage at the predetermined lower limit, and
a step of repeating a cycle containing the voltage increase step, the voltage decrease step, and the hydrogen pumping reaction step two or more times.

2. The method according to claim 1, wherein the voltage is increased and decreased with time in the voltage increase step and the voltage decrease step.

3. The method according to claim 1, wherein the predetermined upper limit is 1 V, and the predetermined lower limit is 0 V.

4. A method for activating a fuel cell having a membrane electrode assembly sandwiched between a pair of separators, wherein the membrane electrode assembly contains an anode and a cathode with a solid polymer electrolyte membrane interposed therebetween, the method comprising:
a step of applying a voltage to the fuel cell while supplying a hydrogen-containing gas to the anode and supplying an inert gas to the cathode,
a voltage increase step of increasing the voltage to a predetermined upper limit,
a voltage maintenance step of maintaining the voltage at the predetermined upper limit,
a voltage decrease step of decreasing the voltage to a predetermined lower limit, and
a step of repeating a cycle containing the voltage increase step, the voltage maintenance step, and the voltage decrease step being repeated two or more times.

5. The method according to claim 4, further comprising a hydrogen pumping reaction step of carrying out a hydrogen pumping reaction while maintaining the voltage at the predetermined lower limit after the voltage decrease step before the voltage increase step in a next cycle.

6. The method according to claim 4, wherein the voltage is increased and decreased with time in the voltage increase step and the voltage decrease step.

7. The method according to claim 4, wherein the predetermined upper limit is 1 V, and the predetermined lower limit is 0 V.

8. The method according to claim 4, wherein the voltage maintenance step is carried out for a period of 30 to 300 seconds.

* * * * *